(12) United States Patent
Ivkovich

(10) Patent No.: US 11,027,352 B2
(45) Date of Patent: Jun. 8, 2021

(54) SYSTEMS AND METHODS FOR ANALYZING WELD SIGNATURES USING PULSE FORENSIC FEATURES

(71) Applicant: Illinois Tool Works Inc., Glenview, IL (US)

(72) Inventor: Stephen P. Ivkovich, East Lansing, MI (US)

(73) Assignee: Illinois Tool Works Inc., Glenview, IL (US)

(*) Notice: Subject to any disclaimer, the term of this patent is extended or adjusted under 35 U.S.C. 154(b) by 965 days.

(21) Appl. No.: 15/264,036

(22) Filed: Sep. 13, 2016

(65) Prior Publication Data

US 2017/0072497 A1    Mar. 16, 2017

Related U.S. Application Data

(60) Provisional application No. 62/218,192, filed on Sep. 14, 2015.

(51) Int. Cl.
*B23K 9/095*     (2006.01)
*B23K 9/09*      (2006.01)
(Continued)

(52) U.S. Cl.
CPC .............. *B23K 9/0953* (2013.01); *B23K 9/09* (2013.01); *B23K 9/173* (2013.01); *B23K 31/125* (2013.01)

(58) Field of Classification Search
CPC ........ B23K 9/0953; B23K 9/09; B23K 9/173; B23K 31/125; B23K 9/0956; B23K 31/12
See application file for complete search history.

(56) References Cited

U.S. PATENT DOCUMENTS 4,375,026 A    2/1983 Kearney
5,714,734 A    2/1998 Peterson
(Continued)

FOREIGN PATENT DOCUMENTS

CN    102528227    7/2012
CN    102596476    7/2012
(Continued)

OTHER PUBLICATIONS

PCT, Notification Concerning Transmittal of the International Preliminary Report on Patentability, in Application No. PCT/US2016/051579, dated Mar. 29, 2018 (8 pages).
(Continued)

*Primary Examiner* — Christopher S Kim
(74) *Attorney, Agent, or Firm* — McAndrews, Held & Malloy, Ltd.

(57) ABSTRACT

Systems and methods for welding are described. The welding system can include, for example, a power source, a computer, and a welding torch. The computer and the welding torch can be operatively coupled to the power source. The power source controls a wire feed and one of a current or a voltage to the welding torch. When the welding torch is performing pulsed welding, the computer is configured to receive a weld signature. The computer is configured to synthesize features from the weld signature and to analyze the features for each pulse of the weld signature to determine whether particular limits have been exceeded or met. If particular limits are exceed or met, a weld fault condition is triggered which causes the welding system to stop or to modify the pulsed welding operation, and/or which causes the welding system to send out communications relating to the triggering of the weld fault condition.

26 Claims, 5 Drawing Sheets

(51) Int. Cl.
*B23K 31/12* (2006.01)
*B23K 9/173* (2006.01)

(56) References Cited

U.S. PATENT DOCUMENTS

| | | | |
|---|---|---|---|
| 5,756,967 A | 5/1998 | Quinn | |
| 6,484,584 B2 * | 11/2002 | Johnson | B23K 31/125 |
| | | | 73/624 |
| 6,583,386 B1 | 6/2003 | Ivkovich | |
| 9,266,182 B2 * | 2/2016 | Hung | B23K 9/1006 |
| 2009/0173726 A1 | 7/2009 | Davidson | |
| 2012/0248081 A1 * | 10/2012 | Hutchison | B23K 9/091 |
| | | | 219/130.51 |
| 2014/0131320 A1 | 5/2014 | Hearn | |
| 2018/0178320 A1 | 6/2018 | Webster | |

FOREIGN PATENT DOCUMENTS

| | | |
|---|---|---|
| CN | 102922089 A | 2/2013 |
| CN | 103331506 | 10/2013 |
| CN | 103862135 | 6/2014 |
| CN | 103909325 | 7/2014 |
| CN | 104379291 | 2/2015 |
| CN | 104551372 | 4/2015 |
| CN | 104768694 | 7/2015 |
| DE | 10200901679 A1 | 10/2010 |
| WO | 2014149786 A1 | 9/2014 |

OTHER PUBLICATIONS

PCT, Notification of Transmittal of the International Search Report and the Written Opinion of the International Searching Authority, or the Declaration, in International application No. PCT/US2016/051579, dated Jan. 10, 2017 (12 pages).

PCT, Notification Concerning Transmittal of the International Preliminary Report on Patentability, in Application No. PCT/US2016/051585, dated Mar. 29, 2018 (8 pages).

PCT, Notification of Transmittal of the International Search Report and the Written Opinion of the International Searching Authority, or the Declaration, in Application No. PCT/US2016/051585, dated Dec. 21, 2016 (12 pages).

* cited by examiner

SYSTEMS AND METHODS FOR ANALYZING WELD SIGNATURES USING PULSE FORENSIC FEATURES

RELATED APPLICATIONS

The present application claims priority to and benefit from U.S. Application No. 62/218,192, filed Sep. 14, 2015. The above-identified application is hereby incorporated by reference herein in its entirety.

BACKGROUND

Pulsed transfer, employed in pulsed metal inert gas (MIG) welding or pulsed tungsten inert gas (TIG) welding, for example, is a modified spray transfer process. Pulsed transfer periodically propels drops of molten metal across the arc to a workpiece.

What is needed are systems and methods that monitor, control, and/or modify pulsed transfer technology and/or processes as used with respect to pulsed MIG welding or pulsed TIG welding, for example.

BRIEF SUMMARY

Methods and systems are provided for a pulsed transfer system (e.g., a pulsed MIG welding system, a pulsed TIG welding system, a pulsed welding system, etc.), substantially as illustrated by and/or described in connection with at least one of the figures, as set forth more completely in the claims.

DETAILED DESCRIPTION

As utilized herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Some embodiments of welding systems and methods according to the present disclosure provide weld signature analysis for pulsed welding. While some embodiments employ weld signature analysis based on feature extraction (e.g., pulse frequency averages, pulse width averages, background averages, peak averages, etc.) over multiple pulses, some embodiments go further by employing pulse forensic techniques. In some embodiments, pulse forensic techniques can be based on syntactic analysis of the signals in which each individual pulse within the weld signature is identified, extracted, and analyzed as an independent entity. A list of such individual pulse results are used to construct advanced features (e.g., forensic features). By monitoring advanced features on a pulse-by-pulse basis, the welding system is capable of identifying potential weld fault conditions that might be lost over averaged signals or averaged features.

Figure 1:
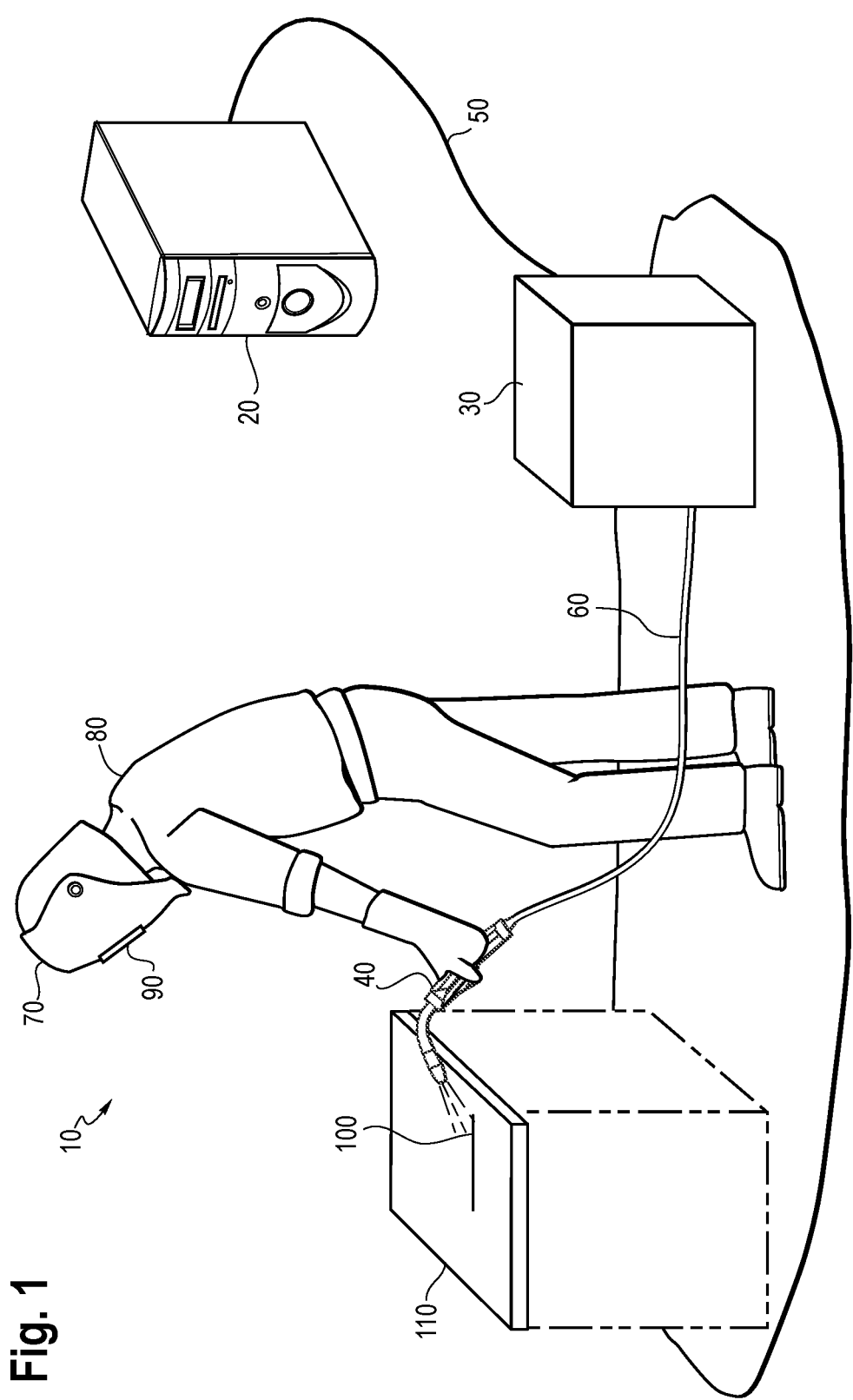
FIG. 1 shows an embodiment of a welding system according to the present disclosure.

FIG. 1 shows an embodiment of a welding system 10 according to the present disclosure. The welding system 10 can include, for example, a computer 20, a power source 30 (e.g., a welding power source, a welding power supply, etc.), a welding torch 40 (e.g., a welding gun, a handheld welding torch, a robotic torch, a semi-automatic torch, etc.).

The computer 20 can be connected to the power source 30 through a computer cable 50 which, in turn, is connected to the welding torch 40 through a welding cable 60. In some embodiments, the computer 20 can be in wireless communication with the power source 30 and/or a headwear 70. In some embodiments, the computer 20 can be part of the power source 30. The computer 20 can be coupled to a display or other output device (not shown). The computer 20 can be configured to use a display that is part of the power source 30, the headwear 70 worn by an operator 80, the computer 20, and/or a separate display. In some embodiments, the welding torch 40 is held by an operator 80 with the headwear 70 which can include a viewing port and/or display 90. The welding torch 40 can be configured to generate an arc 90 through which droplets of welding material are used to form a weld on a workpiece 110. The power source 30 is also connected to the workpiece 100 through a ground cable, a negative cable, and/or a work lead (not shown).

In some embodiments, the power source 30 can be configured to house a wire spool and/or filler spool that is used to provide the welding torch 40 with welding material (e.g., metal, tungsten, etc.). In some embodiments, the power source 30 is connected to a shield gas source (not shown). The power source 30 can be configured to automatically feed the welding torch 40 with the welding material and to provide the shield gas (e.g., an inert shield gas) through the welding cable 60.

In operation, the power source 30 provides current and/or voltage to a consumable electrode (e.g., tip of the feeder wire and/or material) of the torch 40 to form the arc 100. The electrode delivers the current to the point of welding on the workpiece 100 through the arc 100. In the welding system 10, the operator 80 controls the location and operation of the electrode by manipulating the torch 40 and triggering the starting and stopping of the welding process. In some embodiments, during the welding process, the power source 30 rapidly switches the welding output of the torch 40 from high peak current to low background current, or from high peak voltage to low background voltage. The high peak current pinches off a droplet of metal and propels it toward the weldment for good fusion. The low background current maintains the arc, but is too low for metal transfer to occur. With no metal transfer, the weld puddle on the workpiece 110 gets a chance to cool. The process is repeated by the power source 30 as the operator 80 moves the torch 40 form the weld.

In some embodiments, the computer 20 and/or the power source 30 monitor, analyze, control, and/or modify the pulsed welding process on a pulse-by-pulse basis. During the analysis of the pulsed process, feature information is extracted from the weld signature of the pulsed mode MIG process or the pulsed mode TIG process, for example. Feature extraction is an up-front mechanism for effective machine learning and/or embedded analytics, and is effective for characterizing the pulsed mode MIG process or the pulsed mode TIG process, for example. Variations in the pulse weld signature can be correlated to potential weld fault conditions. The computer 20 and/or the power source 30 generate advanced features based on the feature extraction information to provide parameters and/or measurements that can be used for further analysis and monitoring. Advanced features and/or measurements—called Pulse Forensic Features—can include, for example, instantaneous frequency, pulse background slope, pulse droplet location, pulse droplet event magnitude, clear current values, one-droplet-per-pulse (ODPP) quality features, 'ideal pulse' correlation features, other correlation features, consistency metrics, etc. Based on the advanced features parameters and/or measurements, the computer 20 and/or the power source 30 can determine whether potential weld fault conditions exist. In some embodiments, if potential weld fault conditions or weld fault conditions exist, the welding process and/or system can be stopped and/or alerts, indications, messages can be transmitted, displayed and/or heard. In some embodiments, if potential weld fault conditions or weld fault conditions exist, the welding process and/or system can be configured to execute an operator-configured work instruction. In some embodiments, the advanced features parameters and/or measurements can be used to modify the weld process and/or system, or can be used to train or modify behavior in the operator 80.

Figure 2:
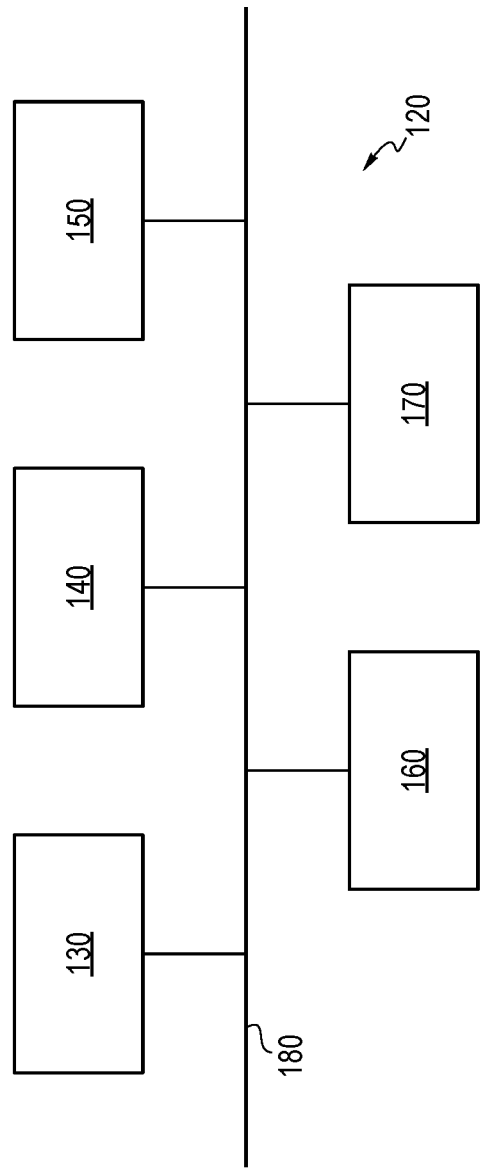
FIG. 2 shows an embodiment of a circuit arrangement according to the present disclosure.

FIG. 2 shows an embodiment of a circuit arrangement (e.g., component arrangement, device arrangement, and/or circuit arrangement) according to the present disclosure. The circuit arrangement 120 illustrated in FIG. 2 is not comprehensive and can be supplemented with other components, devices, and/or circuits as known by one of skill in the art. Further, the circuit arrangement 120 shown in FIG. 2 can be part any of the devices of the system 100. For example, each of the computer 20, the power source 30, and/or the headwear 70 can include its own respective circuit arrangement 200.

In some embodiments, the circuit arrangement 120 can include, for example, one or more processors 130, one or more memories 140 (e.g., one or more nontransitory memories), one or more communication devices 150 (e.g., wireless adapters, wireless cards, cable adapters, wire adapters, dongles, radio frequency (RF) devices, wireless communication devices, Bluetooth devices, IEEE 802.11-compliant devices, WiFi devices, cellular devices, GPS devices, Ethernet ports, network ports, Lightning cable ports, cable ports, etc.), one or more input devices 160 (e.g., keyboards, mouse, touch pad, touch-sensitive screen, touch screen, pressure-sensitive screen, graphical user interface, user interfaces, buttons, microphone, etc.), and one or more output devices 170 (e.g., displays, screens, speakers, projectors, etc.). The processor 130, the memory 140, the communication device 150, the input device 160, and/or the output device 170 can be connected to one or more buses 180 or other types of communication links.

The processor 130 can include, for example, one or more of the following: a general processor, a central processing unit, a digital filter, a microprocessor, a digital processor, a digital signal processor, a microcontroller, a programmable array logic device, a complex programmable logic device, a field-programmable gate array, an application specific integrated circuit, one or more cloud server(s) operating in series or in parallel, and a memory. Code, instructions, software, firmware and/or data may be stored in the processor 130, the memory 140, or both.

The memory 140 can include, for example, one or more of the following: a non-transitory memory, a non-transitory processor readable medium, a non-transitory computer readable medium, read only memory (ROM), random access memory (RAM), non-volatile memory, dynamic RAM (DRAM), volatile memory, erasable programmable ROM (EPROM), electrically EPROM (EEPROM), ferroelectric RAM (FRAM), first-in-first-out (FIFO) memory, last-in-first-out (LIFO) memory, stack memory, non-volatile RAM (NVRAM), static RAM (SRAM), a cache, a buffer, a semiconductor memory, a magnetic memory, an optical memory, a flash memory, a flash card, a compact flash card, memory cards, secure digital memory cards, a microcard, a minicard, an expansion card, a smart card, a memory stick, a multimedia card, a picture card, flash storage, a subscriber identity module (SIM) card, a hard drive (HDD), a solid state drive (SSD), cloud server storage, network storage, etc. The memory 140 can be configured to store code, instructions, applications, software, firmware and/or data for use by the processor 130 and may be external, internal, or both with respect to the processor 130.

In some embodiments, some of the code, instructions, applications, software, firmware and/or data can be hardwired (e.g., hardware implementations, hardwired into registers, etc.) and/or can be programmable.

In some embodiments, some or all of the steps, acts, methods, and/or processes described herein can be performed by code, software, firmware, and/or instructions, for example, that are executed by the processor 130 and stored in the memory 140 and/or the processor 130 of the computer 20, the power source 30, and/or the headwear 80. In some embodiments, the code, software, firmware, and/or instructions executed by the processor 130 of the computer 20, the power source 30, and/or the headwear 80 can configure the processor 130 to perform or cause to perform some or all of the steps, acts, methods, and/or processes described herein.

Some embodiments of the present disclosure provide a method (e.g., an algorithmic method) of detailed processing or data analysis to extract feature information (feature extraction) from the voltage and current components of a weld signature (e.g., Weld Signature®) of a pulse mode MIG welding process or a pulse mode TIG welding process, for example.

Figure 3:
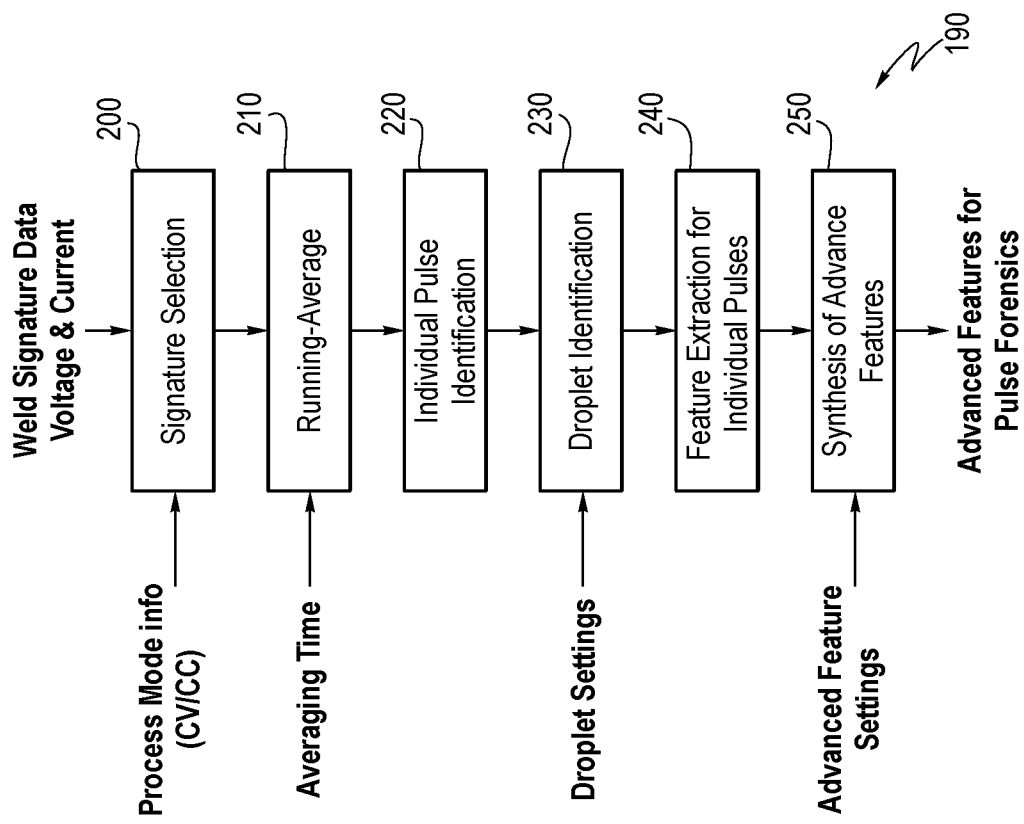
FIG. 3 shows a flow diagram of an embodiment of a pulse forensic analysis method according to the present disclosure.

FIG. 3 shows a flow diagram of an embodiment of a method for pulse forensic analysis. The inputs to the method can include, for example, one or more of the following: settings, the raw data, high-fidelity, sampled voltage and current signature components of a weld signature, and algorithm and/or information inputs. In some embodiments, the method isolates the data for each pulse to extract advanced features from each pulse. The output of the method can include one or more advanced feature data sets (e.g., time-series format of the advanced feature data sets) that can be processed to determine whether potential weld fault conditions exist.

In some embodiments, the use of advanced features instead or in addition to feature extraction can provide the welding system 10 with the capability of detecting potential weld fault conditions that would otherwise not be present by using only feature extraction for fault analysis. Further, in some embodiments, the use of advanced features provides greater resolution or granularity with respect to the fault condition analysis, thereby providing for the pinpointing of problems that would otherwise not be detectable or otherwise be pinpointed. By pinpointing problems, specific solutions can be identified and implemented. Moreover, the welding process can be stopped according to some embodiments to make changes in the welding process in view of the pinpointed problems or in view of the analysis of the advanced features.

Figure 4:
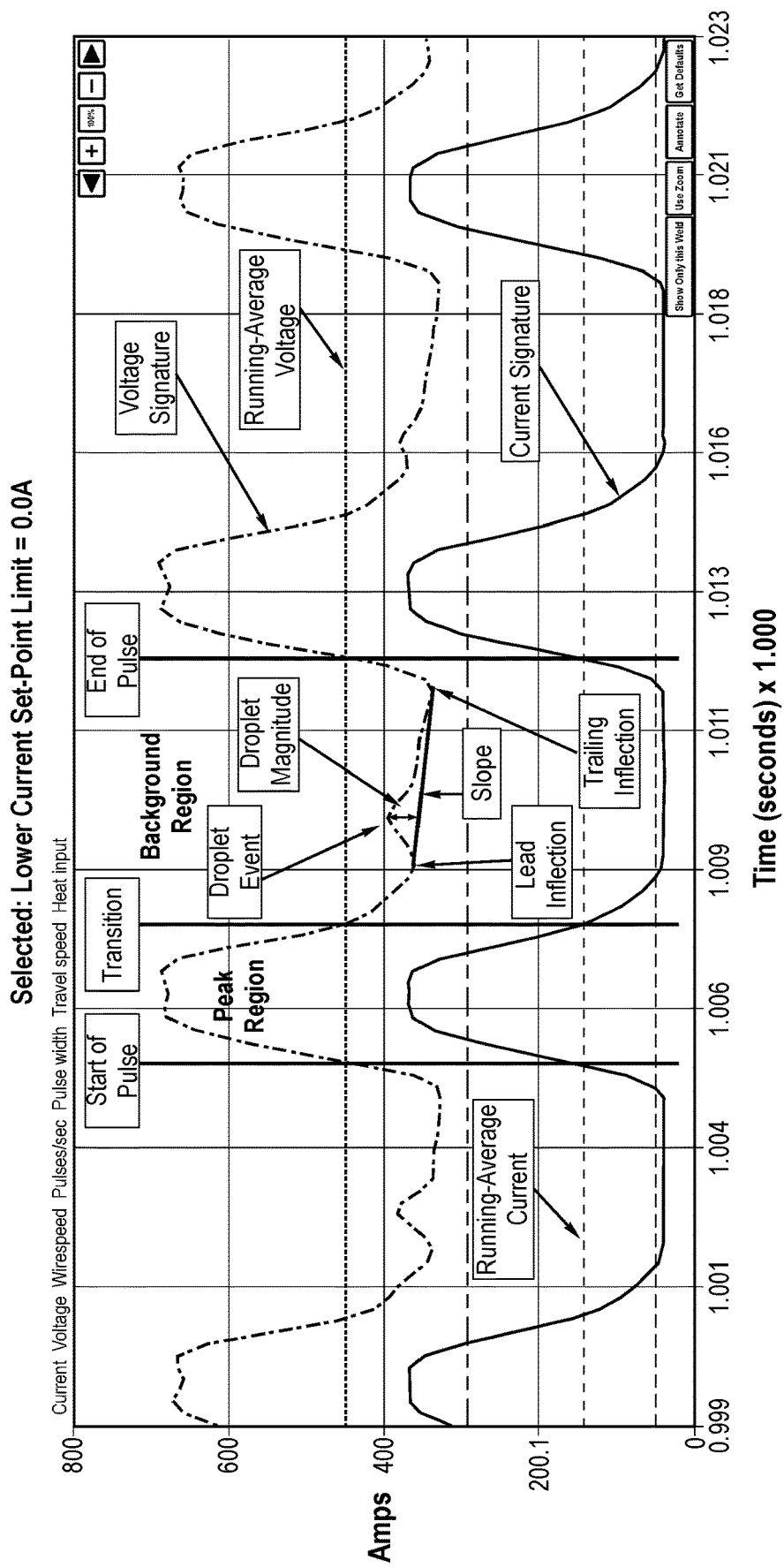
FIG. 4 shows an embodiment of a weld signature that includes a voltage signature (volts v. time) and a current signature (amperes v. time) according to the present disclosure.

Referring to FIG. 3, the steps therein can be performed in the power source 30 and/or the computer 20. The computer can be located physically by the power source or connected via a network to a local computer and/or a cloud computer and/or server. During the process of making welds, the weld signature data including voltage and current between the tip of the torch 40 and the workpiece 110 as a function of time is stored. FIG. 4 shows an embodiment of weld signature data including a voltage signature and a current signature over time from an actual welding process. The weld signature is stored and input into the process as shown in FIG. 3 where the weld signature can be analyzed. In the illustrated example, voltage is driven up causing the wire at the tip of the torch 40 to be form a droplet that is consumed by the plasma arc 100 and for the droplet to be expelled toward the workpiece 110. The droplet is directed along the arc 100 into the weld puddle on the workpiece 110 and causes heat to be transferred. When the voltage is dropped, the current drops and cooling occurs before the pulsed cycle occurs again. The plasma arc is maintained between the torch 40 and the workpiece 110 even when the voltage and the current are dropped to background levels.

With respect to step 200, the method performs signature selection based on the weld signature data (e.g., current signature and voltage signature data) and process mode information (e.g., constant current mode, constant voltage mode, etc.). The process mode information can determine, for example, which signature component to use for determining advanced feature information. In some embodiments, the voltage and current signature components of the welding process are acquired at a suitably high sampling rate (e.g., 1 kHz, 5 kHz, 10 kHz, 100 kHz, etc.). In some embodiments, the sample rate is preferably 5 kHz or higher to preserve signal fidelity.

In some embodiments, the power source 30 keeps one component (e.g., current or voltage) of the weld signature substantially constant (e.g., one component is controlled so as not to vary substantially from a predetermined pulsed signal), while the power source 30 allows the other component to vary in accordance with the welding operation. In some embodiments, the signature component that is allowed to vary is the component that is used to extract the pulse forensic features. The signature component which is held substantially constant is used to identify the pulse boundaries, for example. For example, in FIG. 4, the power supply 30 is controlling the current and the wire speed. The current is held substantially constant and the voltage is allowed to vary or to freely range within the context of the welding process. In some embodiments, the current is held constant compared to a pre-conceived notion of what a pulse should be. The variations in the voltage signature provide indications and information about the welding process including identifying any problems as well as their solutions.

In some embodiments, the current is held substantially constant and the voltage is allowed to vary or to freely range within the context of the welding process. Since current is reliably controlled, pulse boundaries can be identified in the current signature including, for example, pulse start, transition, and pulse end. Since voltage is allowed to vary or to freely range within the context of the welding process, pulse forensic features can be identified in the voltage signature including a droplet event, slope, and droplet magnitude.

In some embodiments, the voltage is held substantially constant and the current is allowed to vary or to freely range within the context of the welding process. Since voltage is reliably controlled, pulse boundaries can be identified in the voltage signature including, for example, pulse start, transition, and pulse end. Since current is allowed to vary or to freely range within the context of the welding process, pulse forensic features can be identified in the current signature including a droplet event, slope, and droplet magnitude.

With respect to step 210, the method performs a running average operation, based on an averaging time input, on one or more components of the weld signature. In some embodiments, the averaging time input can include a couple of pulses up to a hundred pulses; however, other numbers of pulses are also contemplated. In some embodiments, a local average of the signature component being held substantially constant is computed based on a moving window or running average. In some embodiments, the moving average window can be on the order of a quarter of a second, but other times can be selected to accommodate different pulse welding processes. FIG. 4 shows, as dotted lines, examples of running averages for the voltage and the current according to some embodiments of the present disclosure.

With respect to step 220, the method performs individual pulse identification. In some embodiments, the running average of the weld component being held substantially constant is used as a baseline threshold by which to identify individual pulses including pulse start, transition, and pulse end for each pulse. FIG. 4 shows an embodiment of a methodology used to identify individual pulse events in the weld signature components. Each individual pulse is identified and processed independently (syntactic analysis). Pulses are identified by comparing the rising and trailing edges to the running-average of the constant signature component (e.g., the voltage or current signature component that is being controlled to be like a predetermined pulse characteristic). The crossing of the running-average threshold can be used to identify, for example, a start time of the pulse, a transition time of the pulse, and an end time of the pulse.

With respect to steps 230 and 240, the method performs droplet identification based on droplet settings and performs feature extraction for individual pulses. After a pulse is identified, multiple features are extracted for the each pulse as shown in FIG. 4 including, for example, one or more of the following: a lead inflection time point, a trailing inflection time point, a slope between inflection points, and/or a time and a magnitude of any droplet event(s) (if any exist). A list of the features to be extracted can be maintained, stored, and/or modified. Droplet settings can be used to adapt the method (e.g., an algorithm) for expected details of droplet operation based on the process mode including, for example, slow pulse TIG, aluminum pulsed gas metal arc welding (PGMAW), etc. In some embodiments, droplet settings can indicate that the droplet occur between the lead inflection and the trailing inflection. However, in other embodiments, droplet settings can indicate that the droplet occur in a transition time zone around a transition time. In some embodiments, droplet settings can express expectations about the droplet such as the droplet being expelled during the background region which can be, for example, between the transition and the end of the pulse. In some embodiments, the droplet settings limit where the method and/or algorithm searches for the droplet event.

With respect to step 250, the method performs advanced features synthesis based on advanced feature settings. In some embodiments, multiple advanced feature time-series are derived from the list of individual pulse features captured in prior steps and combined through a weighted moving window averaging process over the length of the weld. The resulting advanced features provide high fidelity details about variations in the pulsing process that can be used to detect weld fault conditions or to trigger alarms or the transmitting of notifications. In some embodiments, the nominal output rate of the pulse forensic advanced features is 100 Hz, but can be varied from as fast as once per pulse (which depends on the operating pulse rate of the welding machine and/or power supply 30) to as low as 10 Hz. Selection of the output rate for the advanced features is a classical tradeoff between measurement sensitivity and measurement statistical stability that can vary depending on the process and requirements for detection of weld faults.

In some embodiments, a list of advanced features (e.g., pulse forensic advanced features) derived from pulse forensic analysis and the values corresponding to the advanced features are stored.

In some embodiments, advanced features can include, for example, instantaneous frequency, which is fine accuracy measure of pulse rate. It can be determined on a pulse-by-pulse basis and the data can have a greater resolution or a finer granularity than a pulse.

Some embodiments provide that advanced features can include, for example, a background slope which can be the slop of the background region of the pulse. In some embodiments, the background slope can be a background slope during a droplet event, and/or a slope between a lead inflection time and a trailing inflection time.

Some embodiments provide that advanced features can include, for example, droplet location which can be, for example, a length of time from a start of the pulse to a start of a droplet event (e.g., a primary droplet event). Some embodiments provide that advanced features can include, for example, droplet magnitude which can be a magnitude of a projection of the droplet above a slope line (e.g., a background slope line).

Some embodiment provide a weld signature that includes a current signature and a voltage signature. The advanced features synthesized from the weld signature include, for example, pulse boundaries from the current signature and droplet features from the voltage signature. The droplet features from the voltage signature can include, for example, a slope of a droplet event and a droplet magnitude. Further droplet features can include, for example, a lead inflection time, a trailing inflection time, and a slope between the lead inflection time and the trailing inflection time. The droplet features from the current signature can include, for example, a clear current value.

Some embodiments provide that advanced features can include, for example, pulse peak statistics which can include, for example, a set of statistical measures derived (e.g., solely derived) from the characteristics of the pulse peak area. Some embodiments provide that advanced features can include, for example, pulse background statistics which can include, for example, a set of statistic measures derived (e.g., derived solely) from the characteristics of the pulse background area.

Some embodiments provide that advanced features can include, for example, one-droplet-per-pulse (ODPP) quality feature in which it is determined how close to optimal (100 on a scale of 1 to 100) the ODPP operation in the pulsing process.

Some embodiments provide that advanced features can include, for example, an optimal process quality feature in which it is determined how close to optimal (100 on a scale of 1 to 100) the operation of the pulsing process behaves.

Some embodiments provide that advanced features can include, for example, wavelet pulse statistics that can include, for example, a set of statistical measures derived by wavelet analysis by comparing each individual pulse to a master reference or "mother" pulse form.

Some embodiments provide that advanced features can include, for example, measures of the current at specific times related to the droplet location which represent the clear current of the pulsing process.

Some embodiments provide that advanced features can include, for example, measures of consistency where the value of consistency is [0,1], for example, where 1 is optimal. In some embodiments, consistency may be computed by the formula $1-(F_{sd}/F_{mean})$, where $F_{sd}$ is the local standard deviation of the feature and $F_{mean}$ is the local mean of the feature. Consistency can be computed on any of the advanced features and presented as a way of normalizing the result to a scale of [0,1]. Other scale ranges or normalizations are also contemplated. Local refers to the time range or window over which the consistency is computed and can range from relatively small (e.g., approximately 0.01 seconds or smaller) to relatively large (e.g., greater than 2 seconds). In some embodiments, the local standard deviation and the local mean are computed using a local window of samples (e.g., weighted samples) in time around a particular point of interest.

Some embodiments provide that advanced features can include, for example, measures of the slopes related to pulse boundaries (e.g., a pulse starting point, a pulse transition, and/or a pulse ending point) or other specific locations in the timing of the pulse.

Some embodiments provide that advanced features can include, for example, comparative measures that compare the values of the voltage to the values of the current signatures at specific locations in the timing of the pulse.

Some embodiments provide that advanced features can include, for example, template matching measures that compare the values of the voltage to the values of the current signatures at specific locations in the timing of the pulse to other pulses and/or an ideal template pulse.

Some embodiments provide that advanced features can include, for example, template matching measures where each pulse is matched to one of a list of pre-specified pulse templates.

Some embodiments provide that advanced features can include, for example, features that are measures of the raw signals such as voltage, current, wire feed speed, gas flow, impedance, power, etc.

Some embodiments provide that advanced features can include, for example, features that are functions of raw values including one or more of the following: additions, subtractions, multiplications, divisions, derivatives, integrals, etc. in the time or frequency domains.

Some embodiments provide that advanced features can include, for example, features that are functions from control loops such as command values, error values, step changes, process changes, etc.

Some embodiments provide that advanced features can include, for example, features that are derived via the use of artificial intelligence, neural networks, expert systems and the like.

In some embodiments, limits and/or adjusted limits are set for each of the monitored advanced features. In some embodiments, when the values of the advanced features approach the limits and/or adjusted limits, warning alerts can be triggered and/or warning messages can be sent. In some embodiments, when the values of the advanced features exceed the limits and/or adjusted limits, alerts can be triggered, messages can be sent, and/or the welding process can be stopped by the power source 30, the computer 20, and/or the operator 80. In some embodiments, the welding process can be modified and/or adjusted after the welding operation is stopped or during the welding operation when the values of the advanced features approach or exceed the limits and/or adjusted limits. In addition, weights can be assigned to monitored advanced features so that monitored advanced features can be given greater significance than others.

Figure 5:
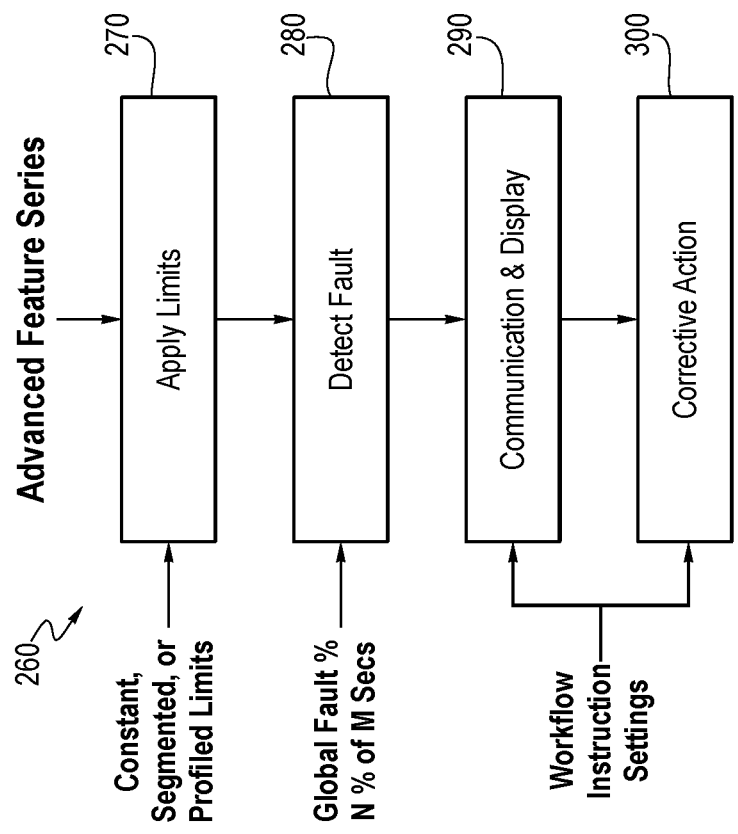
FIG. 5 shows a flow diagram of an embodiment of a fault processing method according to the present disclosure.

FIG. 5 shows an embodiment of fault processing 260 that is applied to each advanced feature according to the present disclosure. Once computed, the pulse forensic advanced features are used to detect potential weld faults and allow the system to communicate and/or take corrective action.

With respect to step 260, the process applies limits to each advanced feature. In some embodiments, each point of the advanced feature can be compared with an upper and lower limit Upper and lower limit exceedances can be tracked independently. In some embodiments, the limits can be preset. In some embodiments, the limits can be specific to the part and/or weld location and/or sequence on the part. Limits can be derived from a weld class—a pre-specified weld process and limit set that can govern multiple similar welds.

In some embodiments, upper and/or lower limits can be one or more of the following: a fixed limit that is the same over the duration of a weld; a segmented limit that is constant over subsets of time over the duration of the weld; and a profiled limit that is changes (e.g., changes continuously) over the duration of the weld.

In some embodiments, the limits can be manually set via tabular entry or graphical manipulation on a display. The limits can be derived from historical weld signatures via a number of manually enhanced or automated learning processes. Limits can be adaptively derived on a weld-by-weld basis from historical data.

In some embodiments, one or more sets of limits may be used in parallel to enhance fault detection.

With respect to step 280, the process detects a fault based on constant, segmented, and/or profiled limits. In some embodiments, the limit exceedance information, over the duration of the weld, is used to determine if a weld fault should be detected and/or indicated.

In some embodiments, two methods can be used (e.g., in parallel) to detect faults and/or indicate faults. In a first method, a pre-specified allowable global fault percentage can be specified for each specific weld or class of welds. The number of limit exceedances—upper and lower can be processed independently—is tabulated for the entirety of the weld. If the total exceeds the allowable global fault percentage, then a weld fault for this type (e.g., Fault Type=Upper Instantaneous Frequency) is indicated. If the duration of the weld is not pre-specified, then the weld fault is determined at the conclusion of the weld. However, if the duration of the weld is known a-priori, then the allowable fault percentage can be understood as a specific time (e.g., percentage of a specific duration setting) and a weld fault can be called during the weld if the total exceedance time exceeds that specific time.

In a second method, pre-specified settings for N and M can be specified for each specific weld or class of welds. The number of limit exceedances—upper and lower can be processed independently—is tabulated (e.g., tabulated continuously) for sets of M seconds as the weld occurs. If the exceedances of a particular M second window exceed N percent of that window, then a weld fault for this type is indicated.

In some embodiments, when a weld fault is indicated, the type of weld fault is captured and passed to the next step in the process. Multiple fault types can occur and be handled on the same weld.

With respect to steps 290 and 300, the process communicates and/or displays detected faults and performs corrective action based on workflow instruction settings. In some embodiments, workflow is a methodology for automatically handling synchronous and asynchronous events which occur in the production welding process a pre-specified way with pre-specified actions or behaviors. This methodology provides a way for the system to be pre-configured or "programmed" by the end user to achieve a highly choreographed and effective operation.

In some embodiments, synchronous workflow events are events that occur, in an expected sequence, in the operation of the production welding process or job such as, for example, one or more of the following: job load, part start, first weld, last weld, part end, etc.

In some embodiments, asynchronous workflow events are events that occur in the operation of the production welding process or job but which occur in an unexpected sequence when compared to the synchronous workflow events such as, for example, one or more of the following: shift change, lunch break, machine downtime, supervisor log-in, etc.

In some embodiments, workflow instructions are the pre-specified operations that are desired to occur when specific events happen such as, for example, one or more of the following: send email and/or text information to a supervisor, play a video, sound an alarm, shutdown the welding machine (e.g., power supply 30), disable the manual welding torch 40, etc. These examples are but a small subset of the useful work instructions contemplated by some embodiments.

In this context (e.g., the detection of a weld fault of a specific type), pre-set workflow instructions can be set so that the system can respond uniquely to an indicated weld fault. The instructions can be set so that they are applicable to any weld fault for any weld, or so that they only apply to a specific fault type on a specific weld location of a specific part of a specific job, or to any combination in between these conditions.

In some embodiments, weld fault indications can be displayed and/or communicated in a number of ways. Faults can be consolidated such that if any fault occurs a "red light" alarm can be shown in the welding cell, on the welding machine, on a local operator display, on a fault indicator at a supervisor station, and/or on a remote display device. More specific fault information, including the type and character of the fault, can be displayed to the operator in real-time and historically through a graphical interface (e.g., a user graphical interface, a software graphical interface, a touch-sensitive graphical interface, etc.) in association with the source device, the part, the weld signature and/or weld report. Communication and display can be performed as an intrinsic part of the normal operation of the software and/or hardware of the system, or it can be caused by the execution of a specific workflow instruction that has been added to uniquely provide a desired form of communication and display.

In some embodiments, weld fault indications can cause the system to take corrective action in a number of ways. Faults can be consolidated such that if any fault occurs, a corrective action can be taken. Corrective actions can include such operations as, for example, one or more of the following: lock the part clamping mechanism without automatically releasing a part until the part has been inspected; disable the manual welding torch until a supervisor resets the system; and/or automatically move the part into a scrap bin. More specific corrective actions, which are specific (and possibly limited) to the type and character of the fault, can be taken. Corrective action can be done as an intrinsic part of the normal operation of the software and hardware of the system, or it can be caused by the execution of a specific workflow instruction that has been added to uniquely provide a desired form of corrective action.

Some embodiments of the methods and systems described herein provide a number of advantages, some of which are discussed below.

Some embodiments provide accurate, high-fidelity features that accurately represent variations in the pulse weld process which can, in turn, be used to detect weld defect conditions.

Some embodiments are easily expandable or scalable to include additional features representing variations specific to a particular welding machine (e.g., a particular power supply), a particular welding process, or a particular fault mode.

Some embodiments integrates seamlessly into the normal flow and usage of weld monitoring tools and can be embodied in either power sources (e.g., welding power supplies) and/or in post-processing software or algorithms.

Some embodiments provide additional advanced features or sets of features that can be added as the knowledge of pulse process details and the effect of particular fault mode conditions develop.

Some embodiments provide for alternative means of synthesizing advanced feature time series that can be based on the selection of mode, max, min, outlier removal, and/or other means instead of a moving window averaging process or a weighted moving window averaging process.

Some embodiments contemplate that the selection of 100 Hz as a default output advanced feature rate is not deterministic. Higher or lower feature rate outputs can be provided. 100 Hz is representative of the normal expected rate of change of the traditional pulsing processes and is not meant to be limiting to any disclosed embodiment.

The present method and/or system may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A welding system, comprising:
one or more processors configured to be operatively coupled to a welding torch; and
a memory coupled to the one or more processors and comprising machine readable instructions which are executed by the one or more processors to cause the one or more processors to, while pulsed welding is performed with the welding torch:
receive a weld signature representative of the pulsed welding, wherein the weld signature comprises a current signature and a voltage signature, each of the current signature and the voltage signature comprising a plurality of weld pulses outputted via the welding torch;
extract pulse boundaries of each of the plurality of weld pulses from the current signature;
extract droplet features of each of the plurality of weld pulses from the voltage signature based on the extracted pulse boundaries; and
analyze the pulse boundaries and the droplet features for each of the plurality of weld pulses of the weld signature.

2. The welding system according to claim 1, wherein the instructions cause the one or more processors to control the welding system to act on the welding torch if there is a weld fault condition based on the analysis of the features.

3. The welding system according to claim 1, wherein the instructions cause the one or more processors to control the welding system to trigger an alarm if there is a weld fault condition based on the analysis of the features.

4. The welding system according to claim 1, further comprising a communication device, wherein the instructions cause the one or more processors to control the communication device to send an email or text notification if there is a weld fault condition based on the analysis of the features.

5. The welding system according to claim 1, wherein the instructions cause the one or more processors to control the welding system to execute an operator configured work instruction if there is a weld fault condition based on the analysis of the features.

6. The welding system according to claim 1, further comprising:
a power source operatively coupled to the welding torch, wherein the power source is configured to:
output a substantially constant pulsed current from the welding torch to a workpiece for each of the weld pulses; and
allow a pulsed voltage from the welding torch to the workpiece to vary for each of the weld pulses in a context of the pulsed welding.

7. The welding system according to claim 1, wherein the instructions cause the one or more processors to extract the droplet features from the voltage signature by extracting at least one of a slope of a droplet event and a droplet magnitude.

8. The welding system according to claim 1, wherein the instructions cause the one or more processors to extract the droplet features from the voltage signature by extracting at least one of a lead inflection time and a trailing inflection time.

9. The welding system according to claim 1, wherein the instructions cause the one or more processors to extract the droplet features from the voltage signature by extracting at least one of a lead inflection time, a trailing inflection time, or a slope between the lead inflection time and the trailing inflection time.

10. The welding system according to claim 1, wherein the instructions cause the one or more processors to extract the pulse boundaries from the current signature by extracting at least one of a clear current value.

11. A welding system, comprising:
one or more processors configured to be operatively coupled to a welding torch; and
a memory coupled to the one or more processors and comprising machine readable instructions which are executed by the one or more processors to cause the one or more processors to, while pulsed welding is performed with the welding torch:
receive a weld signature representative of the pulsed welding, wherein the weld signature comprises a plurality of weld pulses outputted via the welding torch;
extract features of each of the plurality of weld pulses from the weld signature; and
analyze the features for each of the plurality of weld pulses of the weld signature;
wherein the weld signature includes a first signature and a second signature and the instructions further cause the one or more processors to:
determine a running average of the first signature;
identify boundaries of at least one of the weld pulses based on cross overs with the running average and the first signature;
identify droplet features in the second signature based on the identified boundaries of the at least one of the weld pulses;
set limits related to the droplet features; and
trigger a weld fault condition when values of the droplet features exceed the set limits.

12. The welding system according to claim 11, wherein the first signature is a voltage signature and second signature is a current signature, or wherein the first signature is the current signature and the second signature is the voltage signature.

13. The welding system according to claim 12, wherein the first signature is being controlled to conform to a predetermined pulse waveform.

14. The welding system according to claim 13, wherein the first signature is selected to be controlled to conform to the predetermined pulse waveform.

15. The welding system according to claim 11, wherein the instructions further cause the one or more processors to stop a welding operation if the weld fault condition is triggered.

16. The welding system according to claim 11, wherein the instructions further cause the one or more processors to modify a welding operation if the weld fault condition is triggered.

17. The welding system according to claim 11, wherein the instructions further cause the one or more processors to send an alert or a notification if the weld fault condition is triggered.

18. The welding system according to claim 11, wherein the instructions further cause the one or more processors to identify the droplet features by identifying a droplet event based on the identified boundaries.

19. The welding system according to claim 11, wherein the one or more processors are configured to identify the droplet features by determining a slope and a droplet magnitude in the second signature that is not being controlled by the welding power source to conform to the predetermined pulse waveform.

20. The welding system according to claim 11, wherein the instructions further cause the one or more processors to identify the droplet features by determining a lead inflection time, a trailing inflection time, and a slope between the lead inflection time and the trailing inflection time.

21. A welding system, comprising:
one or more processors configured to be operatively coupled to a welding torch; and
a memory coupled to the one or more processors and comprising machine readable instructions which are executed by the one or more processors to cause the one or more processors to, while pulsed welding is performed with the welding torch:
receive a weld signature representative of the pulsed welding, wherein the weld signature comprises a plurality of weld pulses outputted via the welding torch;
extract features of each of the plurality of weld pulses from the weld signature; and
analyze the features for each of the plurality of weld pulses of the weld signature;
wherein the weld signature that includes a first signature and a second signature, and the instructions further cause the one or more processors to:
determine pulse boundaries from the first signature,
determine pulse forensic features from the second signature based on the determined pulse boundaries,
set limits related to the pulse forensic features, and
trigger a weld fault condition if values of the pulse forensic features exceed the set limits.

22. The welding system according to claim 21, wherein the first signature is a voltage signature and second signature is a current signature, or wherein the first signature is the current signature and the second signature is the voltage signature.

23. The welding system according to claim 22, wherein the instructions further cause the one or more processors to:
control the first signature of the weld signature to conform to a predetermined pulse waveform, and
allow the second signature of the weld signature to vary in a context of pulsed welding operation.

24. The welding system according to claim 21, further comprising:
one or more ports of a welding power source configured to feed wire and shielding gas to a welding torch.

25. The welding system according to claim 21, wherein the instructions further cause the one or more processors to perform on or more of the following: trigger an alarm, send an alarm message, and send a text communication when the weld fault condition is triggered.

26. The welding system according to claim 25, wherein the instructions further cause the one or more processors to stop or to modify the pulsed welding by the welding torch when the weld fault condition is triggered.

* * * * *